No. 774,891.                                              Patented November 15, 1904.

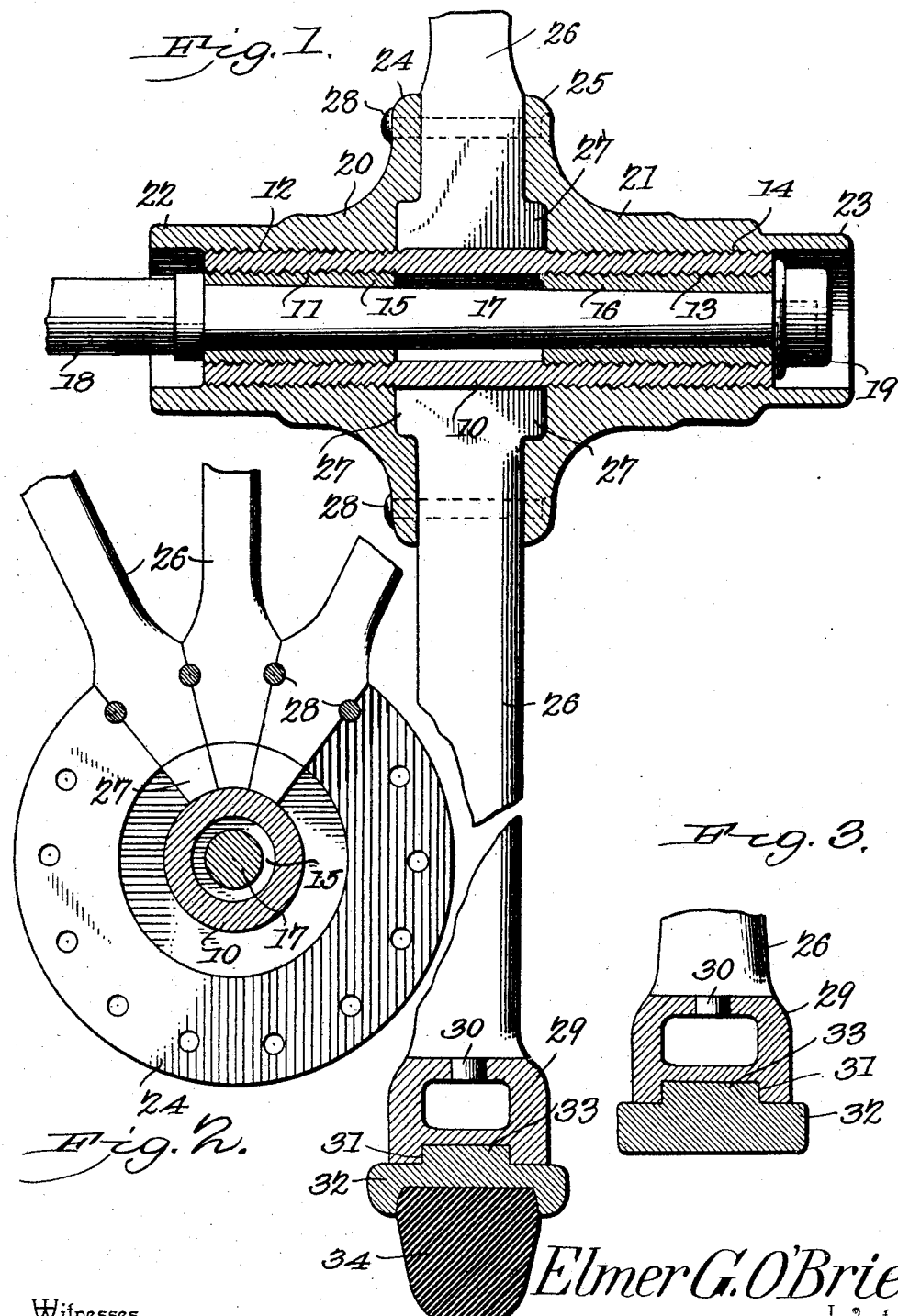

UNITED STATES PATENT OFFICE.

ELMER GEORGE O'BRIEN, OF WELLINGTON, KANSAS.

VEHICLE-WHEEL.

SPECIFICATION forming part of Letters Patent No. 774,891, dated November 15, 1904.

Application filed December 22, 1903. Serial No. 186,207. (No model.)

*To all whom it may concern:*

Be it known that I, ELMER GEORGE O'BRIEN, a citizen of the United States, residing at Wellington, in the county of Sumner and State of Kansas, have invented a new and useful Vehicle-Wheel, of which the following is a specification.

This invention relates to vehicle-wheels, and has for its object to simplify and improve the construction and produce a wheel of greatly-increased strength and durability without increasing the expense; and the invention consists in certain novel features of construction, as hereinafter shown and described, and specified in the claims.

In the drawings illustrative of the invention, in which corresponding parts are denoted by like designating characters, Figure 1 is a sectional view of a wheel embodying the improvements. Fig. 2 is a front view of the hub and portions of the spokes. Fig. 3 is a transverse section of the felly and tire, illustrating a modification in its construction.

In the improved wheel structure is embraced a sleeve 10, forming the core of the hub and internally and externally threaded at the ends, as at 11, 12, 13, and 14, leaving the central portion unthreaded both exteriorly and interiorly, as shown.

Within the sleeve 10 are threaded axle-bearings 15 16, formed to fit the spindle 17 of the axle 18 and held in position thereon by the usual holding-nut 19.

Inclosing the outer threaded portions of the sleeves 10 are internally-threaded hub-bands 20 21, extended at their outer ends into sand-bands 22 23 and with lateral flanges 24 25 at their inner ends, as shown.

It will here be noted that the bearing members 15 and 16 are located at the ends of the spindle, so as to provide terminal bearings for the hub, thereby materially reducing friction and at the same time obtaining a sufficient bearing-surface for the wheel. The bearing members are individually detachable, so as to be conveniently replaced when worn, and are separated by a space which constitutes an oil-chamber to collect excess oil. The intermediate unthreaded internal portion of the core 10 constitutes a shoulder to limit the inward insertion of the bearings 15 and 16, and thereby preserves a sufficient space between the said members to form the desired oil-chamber.

The spokes are represented at 26 and are disposed radially of the sleeve 10 with their inner ends butting against the unthreaded central portion and with the flanges 24 25 bearing against them from opposite sides, as shown.

The inner or adjacent ends of the bands 20 21 are formed with recesses in which offsets or lateral projections 27 on the spokes 26 extend, as shown, and the outer portions of the flanges are connected by clamp-bolts 28, which also pass through recesses in the adjacent portions of the spokes, as shown in Fig. 2.

The felly of the wheel is represented at 29 preferably tubular in cross-section and having spaced apertures to receive tenons 30 upon the outer ends of the spokes 26, by which means the latter are held in position relative to the felly. The outer face of the felly is formed with an encircling channel, as at 31, in which a tire 32 is supported by a rib 33 thereon, as shown. The edges of the tire project laterally beyond the sides of the felly to protect the latter when running over stony or other kinds of rough roads. The tire 32 will preferably be channeled, as in Fig. 1, to support a rubber or other flexible outer tire 34. When the flexible band is not required, the channel will not be formed in the tire 32, as in Fig. 3.

It will be observed that by the arrangement and combination of parts herein shown and described a very strong, compact, and simple wheel is produced, which may be cheaply manufactured, quickly assembled, and which may be quickly adjusted if the parts work loose to maintain it in a very rigid and inflexible condition. All the parts being easily separable when required, broken or worn parts may be easily replaced without sacrificing the whole wheel.

The improvements are applicable to all sizes and forms of vehicle-wheels employed for all purposes, from the heaviest draft-vehicles to the lightest buggies.

All the parts will preferably be of metal or metallic compounds, and in practice the felly may be of brass, aluminium, or the like, the spokes, sleeves, bearings, hub-bands, and tires of steel or similar metal. The spokes may be either solid or tubular and of iron, steel, or other metal; but while the parts will preferably be formed of these metals or metallic compounds I do not wish to be limited thereto, as the parts may be formed of any suitable materials or compounds of materials without departing from the principle of the invention or sacrificing any of its advantages, and the right is reserved of employing any material or compounds of materials in the construction of the wheel which may be found practicable.

Having thus described my invention, what I claim is—

1. A vehicle-hub comprising an open-ended tubular core having internal and external screw-threaded portions at opposite ends which are separated respectively by internal and external intermediate smooth portions, open-ended external screw-threaded tubular bearings removably fitted to the internal screw-threaded portions of the core and separated by the internal smooth portions of said core to constitute an oil-chamber between the bearing members, and hub members having screw-threaded openings receiving the respective external screw-threaded portions of the core.

2. The combination of an open-ended tubular core having internal and external screw-threaded portions at opposite ends which are separated respectively by internal and external intermediate smooth portions, open-ended external screw-threaded tubular bearings removably fitted to the internal screw-threaded portions of the core and separated by the internal smooth portion of said core to constitute an oil-chamber between the bearing members, hub members having screw-threaded openings receiving the external screw-threaded portions of the core, spokes clamped between the hub members, and fastenings piercing and interlocking the hub members.

3. A vehicle-hub comprising an open-ended tubular core having internal and external screw-threaded portions at opposite ends which are separated respectively by internal and external intermediate smooth portions, open-ended external screw-threaded tubular bearings removably fitted to the internal screw-threaded portions of the core and separated by the internal smooth portion of said core to constitute an oil-chamber between the bearing members, hub members adjustably embracing the external screw-threaded portions of the core, and means extending between said hub members to interlock the same.

In testimony that I claim the foregoing as my own I have hereto affixed my signature in the presence of two witnesses.

ELMER GEORGE O'BRIEN.

Witnesses:
 CLARA BAUMAN,
 W. W. SCHWINN.